No. 794,746. PATENTED JULY 18, 1905.
W. K. RICHARDSON.
PROCESS OR METHOD OF AUTOMATICALLY LUBRICATING WHEELS.
APPLICATION FILED FEB. 10, 1905.
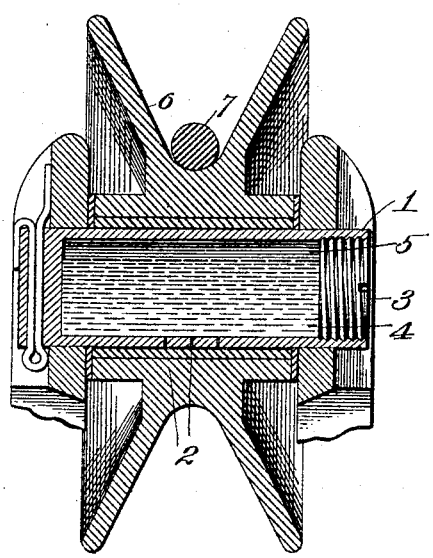
Witnesses
Frank P. Glore.
H. C. Rodgers
Inventor
W. K. Richardson
By George J. Thorpe
Atty.

No. 794,746.

Patented July 18, 1905.

UNITED STATES PATENT OFFICE.

WILLIAM K. RICHARDSON, OF LEAVENWORTH, KANSAS.

PROCESS OR METHOD OF AUTOMATICALLY LUBRICATING WHEELS.

SPECIFICATION forming part of Letters Patent No. 794,746, dated July 18, 1905.

Application filed February 10, 1905. Serial No. 245,053.

*To all whom it may concern:*

Be it known that I, WILLIAM K. RICHARDSON, a citizen of the United States, residing at Leavenworth, in the county of Leavenworth and State of Kansas, have invented certain new and useful Improvements in Processes or Methods of Automatically Lubricating Wheels, of which the following is a specification.

This invention relates to a process or method of ejecting a solidified lubricant from a reservoir by means of the expansion of air therein, and has for its object to evolve a process or method whereby the lubrication of wheels shall be effected automatically, reliably, and only when needed.

Various methods and apparatus have been considered and devised for lubricating wheels, such as trolley-wheels, which are rotated at high speed; but none of said methods or devices, as far as my knowledge extends, automatically supplies the lubricant to the journal when the latter becomes dry and invariably before the temperature is materially raised—*i. e.*, raised sufficiently to melt a solidified lubricant—and supplies such lubricant in quantities sufficient to sustain perfect lubrication of the bearings, and thus insures long life of the working parts.

In carrying out my invention I employ a hollow pin or spindle made air-tight, except at a point or points in its lower side, and provided at one end, by preference, with a removable plug or cap for closing the spindle with an air-tight joint. Through said open end a solidified lubricant is introduced into the spindle and so disposed that it will bridge and cover the orifice or orifices in the lower side of the spindle, but not entirely fill the spindle, as a small air-space should be left. The next step in the method or process is to expand the air contained within the spindle. This is accomplished by heating the spindle by frictional engagement of the wheel thereon, the spindle heating the air contained therein by radiation and conduction. The expansion of the air subjects the lubricant to pressure, and therefore forces out a portion of the lubricant through the orifice or orifices. By the rotation of the wheel this ejected lubricant is spread over the bearing, and the spindle is lubricated and friction eliminated to such an extent that the spindle cools.

A further step in the process or method is the automatic restoration of the air to normal or atmospheric pressure within the pin. As the spindle cools there is a corresponding fall in the temperature of the air contained within the pin or spindle, which lessens its molecular repulsion or pressure, and a partial vacuum exists, or, in other words, a rarefied air occupies the air-space within the pin. Therefore there is an excess of pressure on the outside of the spindle, and the air from the outside rushes into the spindle through the lubricating orifice or orifices to establish an equilibrium between the pressure inside and outside of the pin or spindle, and this volume of air admitted to the spindle is proportionate to the volume of the lubricant ejected, so as to restore the air within the pin to normal or atmospheric pressure, that it may under a second slight rise in temperature again expand and expel solidified lubricant from the spindle. This action is repeated until the lubricant is exhausted.

From the foregoing it will be apparent that I have produced or evolved a process or method of automatically discharging a lubricant in solidified form for lubricating wheels efficiently, reliably, and economically and by which the lubricant is ejected from the spindle in required quantity and at times when lubrication is necessary, by which method a single charge of solidified oil in the pin or spindle insures the proper lubrication of the wheel for a longer period of time than is possible with the types of lubricating apparatus enumerated below—for instance, springs or agitators which expel the lubricant continuously and in disregard of requirements or where the solidified lubricant is converted into a liquid state by heat generated by friction and drained from the reservoir by its static pressure direct on the bearing or to collateral appendages which assist in retaining and distributing the lubricant.

It is further obvious that a pin or spindle of hardened steel that is not subject to high temperature will not lose its temper, and this is very necessary in the pin or spindle for trolley-wheels, as they revolve at a high rate of speed, and by the adoption of my method for the lubrication of wheels it has been demonstrated that one filling of the pin or spindle will lubricate the bearings throughout the life of that part of the wheel which is in contact with the wire and that one spindle will outlast several wheels.

Referring to the accompanying drawing, which represents a central vertical section of the pin or spindle and a trolley-wheel mounted thereon, 1 indicates the hollow pin or spindle forming a reservoir, and 2 the orifice or orifices thereof.

3 indicates the closure plug or cap, 4 the lubricant, and 5 the air-space above the lubricant.

6 indicates the wheel journaled on the pin or spindle, and 7 a trolley-wire engaged by the wheel to cause it to revolve and by friction raise the temperature of the pin or spindle, as hereinbefore explained.

Having thus described the invention, what I claim as new, and desire to secure by Letters Patent, is—

1. The process of lubricating which consists in establishing a supply of solidified lubricant in a receptacle, confining a body of air above the lubricant, and heating the air to cause it to exert a pressure on the lubricant and expel it in a solidified state.

2. The process of lubricating which consists in establishing a supply of solidified lubricant over a restricted exit in a receptacle, confining a body of air above the lubricant, heating said air to thereby exert a pressure on the lubricant and expel it in a solidified state, and replenishing the supply of air to preserve the normal pressure of the same on the lubricant.

In testimony whereof I affix my signature in the presence of two witnesses.

WILLIAM K. RICHARDSON.

Witnesses:
H. C. RODGERS,
G. Y. THORPE.